UNITED STATES PATENT OFFICE 1,961,774

CHEMISTRY

Thomas Midgley, Jr., Worthington, Ohio, assignor to General Motors Corporation, Detroit, Mich., a corporation of Delaware No Drawing. Application July 31, 1930, Serial No. 472,182

4 Claims. (Cl. 202—39)

The present invention relates to distillation and its principal objects are to provide improved method and means for fractional distillation.

In distillation apparatus, whether a tower or column or other form of apparatus, the nature of the surfaces with which the vapors come in contact and upon which the reflux forms or come in contact in returning to the still or both, bears a very important relationship to the efficiency of the apparatus.

I have found that bodies which present to the ascending vapors and/or returning liquid a crystalline surface with sharp edge to the crystals materially improves the efficiency. A true flat crystalline surface with a sharp edge is preferred. As a specific example, silicon carbide crushed or otherwise prepared so as to provide exposed sharp edged crystals gives excellent results. If desired, these crystals may be fastened as a coating on some supporting material within the fractionating column or tower.

Other examples of crystals which may be used are hæmatite, alundum and crushed antimony. These are named herein as examples of crystal forms. The flat faced crystals and particularly the large crystals give the best results. The crushed metals and small crystals are less efficient. More specifically crystals which have a small crystal or grain size such as the grain size of coke give minor results. I prefer crystals which will not pass through an eighty mesh screen. The more important crystals are silicon carbide and hæmatite.

While the form of embodiment of the invention as herein disclosed, constitutes a preferred form, it is to be understood that other forms might be adopted, all coming within the scope of the claims which follow.

What is claimed is as follows:

1. A method of fractional distillation which comprises passing the liquids over exposed sharp-edged crystals and collecting the reflux and distillate.

2. A method of fractional distillation which comprises passing the liquids over exposed sharp-edged flat plate crystals and collecting the reflux and distillate.

3. A method of fractional distillation which comprises passing the liquids over exposed sharp edged crystals taken from a group comprising silicon carbide and hematite and collecting the reflux and distillate.

4. A method of fractional distillation which comprises passing the liquids over exposed sharp edged crystals of silicon carbide and collecting the reflux and distillate.

THOMAS MIDGLEY, Jr.